US007519504B2

(12) United States Patent
Goldman et al.

(10) Patent No.: US 7,519,504 B2
(45) Date of Patent: Apr. 14, 2009

(54) METHOD AND APPARATUS FOR REPRESENTING, MANAGING AND PROBLEM REPORTING IN SURVEILLANCE NETWORKS

(75) Inventors: Jerry Y. Goldman, New City, NY (US); Patricia Florissi, Briarcliff Manor, NY (US); Jeffrey A. Schriesheim, Lexington, MA (US); Amanuel Ronen Artzi, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 198 days.

(21) Appl. No.: 11/391,770

(22) Filed: Mar. 28, 2006

(65) Prior Publication Data

US 2006/0167672 A1 Jul. 27, 2006

Related U.S. Application Data

(63) Continuation-in-part of application No. 10/813,842, filed on Mar. 31, 2004.

(51) Int. Cl.
*G06F 11/30* (2006.01)
*G06F 17/00* (2006.01)
(52) U.S. Cl. .................. 702/181; 702/183; 702/185; 702/187; 348/143; 348/180
(58) Field of Classification Search ............. 702/181, 702/183, 185, 187
See application file for complete search history.

(56) References Cited

U.S. PATENT DOCUMENTS

| 5,528,516 | A  | * | 6/1996 | Yemini et al. | 702/181 |
|---|---|---|---|---|---|
| 5,982,418 | A  | * | 11/1999 | Ely | 348/153 |
| 5,996,023 | A  | * | 11/1999 | Winter et al. | 709/253 |
| 6,157,621 | A  | * | 12/2000 | Brown et al. | 370/310 |
| 6,990,518 | B1 | * | 1/2006 | Secer | 709/223 |
| 7,143,008 | B2 | * | 11/2006 | Ochi et al. | 702/186 |
| 2005/0025147 | A1 | * | 2/2005 | Hamada et al. | 370/389 |
| 2005/0125151 | A1 | * | 6/2005 | Lee | 701/213 |
| 2005/0278052 | A1 | * | 12/2005 | Bett et al. | 700/108 |
| 2006/0184961 | A1 | * | 8/2006 | Lee et al. | 725/32 |
| 2007/0192586 | A1 | * | 8/2007 | McNeely | 713/153 |

* cited by examiner

*Primary Examiner*—Hal D Wachsman
(74) *Attorney, Agent, or Firm*—Krishnenda Gupta; Joseph D'Angelo

(57) ABSTRACT

A method, system and computer product for performing a system analysis of a surveillance network containing a plurality of components. The method comprises the steps of representing selected ones of the plurality of components, providing a mapping between a plurality of observable events and a plurality of causing events occurring in components, wherein the observable events are at least associated with each of the at least one components, and determining at least one likely causing event based on at least one of the plurality of observable events by determining a measure between each of a plurality of values associated with the plurality of observable events and the plurality of causing events.

4 Claims, 13 Drawing Sheets

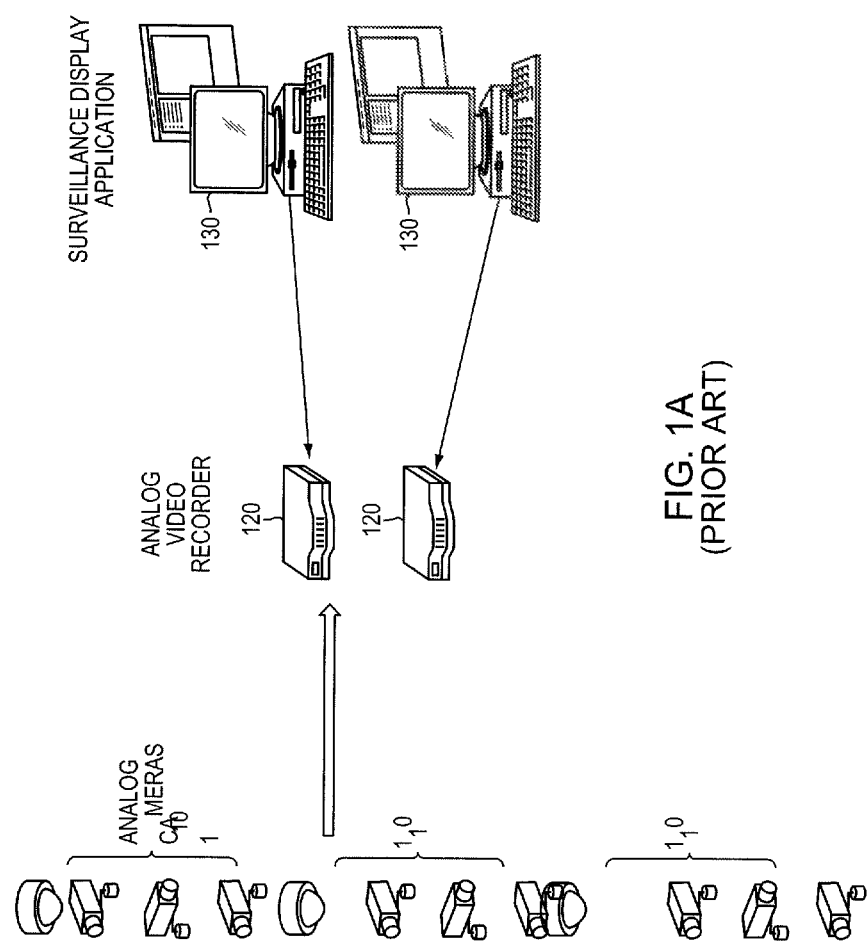

EXAMPLE OF A NEXT GENERATION SURVEILLANCE NETWORK

| CLASS | DIAGNOSIS | EXPLANATION |
|---|---|---|
| NETWORK CAMERA | DOWN | THE DEVICE IS NOT FUNCTIONING PROPERLY, WHILE ITS HOSTING UNITARY COMPUTER SYSTEM IS UP AND RUNNING |
| SURVEILLANCE APPLICATION | DOWN | THE SURVEILLANCE APPLICATION IS NOT FUNCTIONING PROPERLY, WHILE ITS HOSTING UNITARY COMPUTER SYSTEM IS UP AND RUNNING |
| NETWORK CAMERA | UNREACHABLE | THE CAMERA IS NOT REACHABLE FROM THE MANAGEMENT STATION |
| SURVEILLANCE APPLICATION | UNREACHABLE | THE APPLICATION IS NOT REACHABLE FROM THE MANAGEMENT STATION |

FIG. 5

SURVEILLANCE APPLICATION SERVER
◻ -DOWN
SURVEILLANCE APPLICATION SERVICES
◻ VIDEO MONITORING SERVICE - DOWN/ADMIN DOWN
◻ RFID MONITORING SERVICES - DOWN/ADMIN DOWN
◻ OTHER
VIDEO SERVER
◻ VIDEO SERVER - DOWN/ADMIN DOWN
VIDEO CAMERA
◻ VIDEO CAMERA IS DOWN/ADMIN DOWN
◻ VIDEO CAMERA NotOPERATIONAL
VIDEO ADAPTER
◻ VIDEO ADAPTER DOWN/ADMIN DOWN
◻ VIDEO ADAPTER NotOPERATIONAL
STORAGE REPOSITORY
◻ StorageREPOSITORY DOWN/ADMIN DOWN
◻ StorageREPOSITORY NOT OPERATIONAL
◻ STORAGE REPOSITORY OUT OF CAPACITY
RFID READER
RFID DEVICE

FIG. 6A

SURVEILLANCE APPLICATION SERVICES
 ☐   VIDEO MONITORING SERVICE - DOWN/DEGRADED
 ☐   RFID MONITORING SERVICES - DOWN/DEGRADED
VIDEO SERVER
 ☐   DEGRADED
VIDEO ADAPTER
 ☐   DEGRADED
STORAGE REPOSITORY
 ☐   DEGRADED
VIDEO LINK
 ☐   VIDEO LINK DOWN
 ☐   VIDEO LINK DEGRADED
RFID LINK
 ☐   RFID LINK DOWN
 ☐   RFID LINK DEGRADED
SURVEILLANCE LINK
 ☐   DOWN
 ☐   DEGRADED
SURVEILLANCE END POINT
 ☐   SEP NOT MONITORED
 ☐   SEP DEGRADED MONITORING
 ☐   SEP ADMIN DOWN
SURVEILLANCE BUSINESS TARGET (ST)
 ☐   ST NOT MONITORED
 ☐   ST LOST
 ☐   ST DEGRADED

METHOD AND APPARATUS FOR REPRESENTING, MANAGING AND PROBLEM REPORTING IN SURVEILLANCE NETWORKS

CLAIM OF PRIORITY

This application is a continuation-in-part, and claims the benefit pursuant to 35 USC §120 of the earlier filing date, of U.S. patent application Ser. No. 10/813,842, entitled "Method and Apparatus for Multi-Realm System Modeling" filed Mar. 31, 2004, the contents of which are incorporated by reference herein.

RELATED APPLICATIONS

This application is related to U.S. patent application Ser. No. 11/263,698 entitled "Apparatus and method for Event Correlation and Problem Reporting," which is a continuation of U.S. patent application Ser. No. 11/034,192, entitled "Apparatus and Method for Event Correlation and Problem Reporting," filed on Jan. 12, 2005, now U.S. Pat. No. 7,003,433, which is a continuation of U.S. patent application Ser. No. 10/400,718, entitled "Apparatus and Method for Event Correlation and Problem Reporting," filed on Mar. 27, 2003 now U.S. Pat. No. 6,868,367, which is a continuation of U.S. patent application Ser. No. 09/809,769 filed on Mar. 16, 2001, now abandoned, which is a continuation of U.S. patent application Ser. No. 08/893,263, now U.S. Pat. No. 6,249,755, filed on Jul. 15, 1997, which is a continuation of U.S. patent application Ser. No. 08/679,441, now U.S. Pat. No. 5,661,668, filed on Jul. 12, 1996, which is a continuation of U.S. patent application Ser. No. 08/249,282, now U.S. Pat. No. 5,528,516, filed on May 25, 1994.

BACKGROUND

This invention relates generally to networks, and more specifically to apparatus and methods for modeling, managing, analyzing and determining root cause errors in surveillance networks.

Video monitor surveillance systems are well-known in the art and their presence has continued to increase to afford security. For example, video monitor systems have been used in gambling casinos, in banks, at ATM machines, and other such facilities. Video monitoring systems have even been expanded to the home environment to monitor activities while the home owner is away.

Current state of the art of video monitoring is limited the systems are typically point-to-point networks. With the advent of internet (IP) technologies, surveillance systems have begun using the internet to provide greater access to the monitored information. For example, computer based digital cameras enable a home-owner to monitor from a remote location activities occurring in the home via an internet connection.

However, while the use of internet (IP) based surveillance networks is advantageous in providing greater flexibility and diversity in the presentation of the collected information, the number of components not associate a surveillance system increases and failures in one or more of the system components may have significant impact on the surveillance system performance. The use of IP based surveillance also increases the opportunity to integrate the function of video monitoring with other related surveillance functions such as RFID monitoring. For example, integrating these two domains enables the video data and scanned RFID tagged data to be tightly bound and hence provide the observer with more accurate and timely visual identification. This however increases the complexity of managing the surveillance process and underlying infrastructure.

Hence, there is a need in the industry for a method and system for representing, analyzing and determining root cause errors and the impact of such errors in surveillance networks.

SUMMARY OF THE INVENTION

A method, system and computer product for analyzing a surveillance network containing a plurality of component are disclosed. The method comprises the steps of representing selected ones of the plurality of components, providing a mapping between a plurality of observable events and a plurality of causing events occurring in components, wherein the observable events are at least associated with each of the at least one components; and determining at least one likely causing event based on at least one of the plurality of observable events by determining a measure between each of a plurality of values associated with the plurality of observable events and the plurality of causing events. In one aspect of the invention, selected ones of the plurality of components are represented in a plurality of domains, wherein for each domain, at least one of the plurality of components is associated with at least two of the domains, providing a mapping between a plurality observable events and a plurality of causing events occurring in components in each of the domains, wherein the observable events are at least associated with each of the at least one component associated with at least two of the domains, determining at least one likely causing event based on at least one of the plurality of observable events by determining a measure between each of a plurality of values associated with the plurality of observable events and the plurality of causing events in selected domains; and determining a likely causing event by correlating the likely causing events associated with each of the domains.

Other embodiments of the invention include a computerized device, configured to process all of the method operations disclosed herein as embodiments of the invention. In such embodiments, the computerized device includes a memory system, a processor, a communications interface and an interconnection mechanism connecting these components. The memory system is encoded with a load manager (or store process) application that when performed on the processor, produces a load manager (or store) process that operates as explained herein within the computerized device to perform all of the method embodiments and operations explained herein as embodiments of the invention.

Other arrangements of embodiments of the invention that are disclosed herein include software programs to perform the method embodiment steps and operations summarized above and disclosed in detail below. More particularly, a computer program product is disclosed that has a computer-readable medium including computer program logic encoded thereon that when performed in a computerized device provides associated operations explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software processes on several computers, or all processes could run on a small set of dedicated computers or on one computer alone.

BRIEF DESCRIPTION OF THE DRAWINGS

FIG. 1A illustrates a conventional surveillance network and FIG. 1B illustrates a next generation network;

FIG. 5 illustrates an exemplary analysis of errors occurring in the surveillance network shown herein;

FIGS. 6A and 6B illustrate an exemplary analysis of the impact on a business operation when a failure at a lower level in a surveillance network occurs;

Figure 1B:
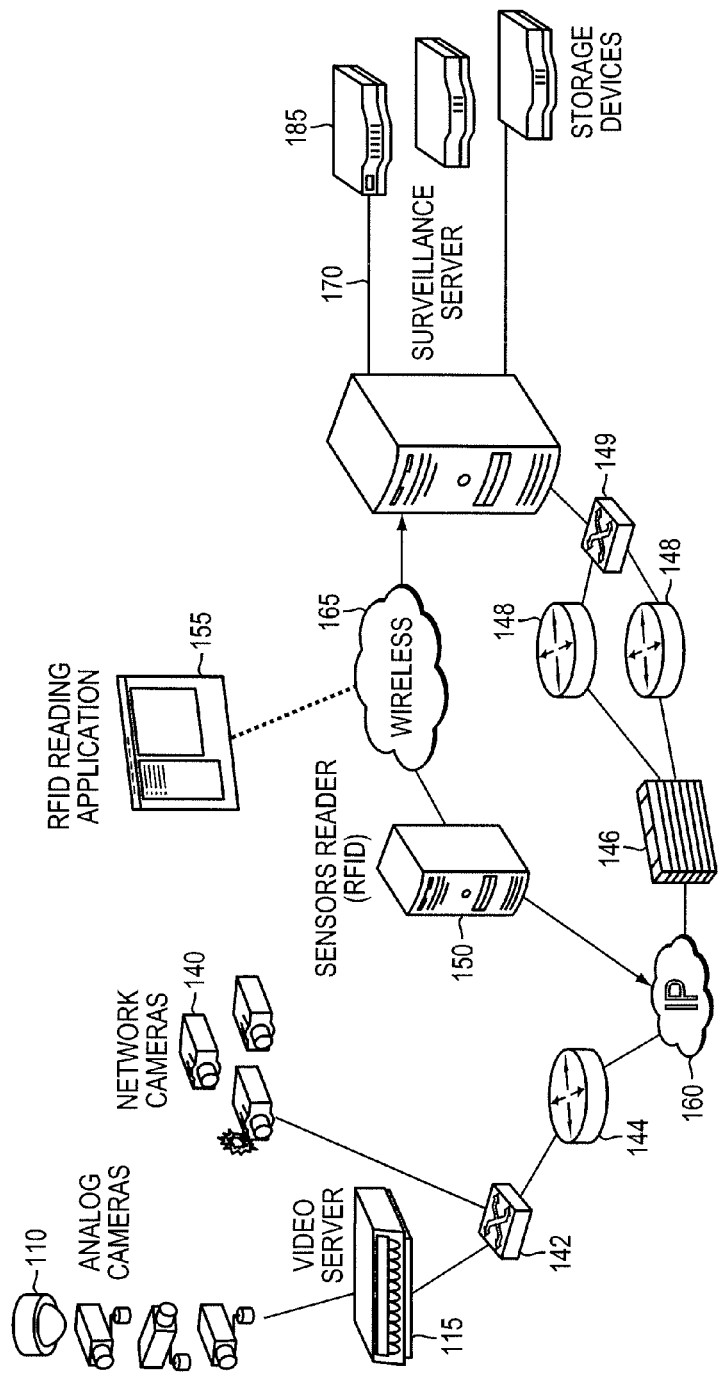

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1A illustrates in a block diagram form a conventional surveillance network wherein analog cameras 110 are directly connected to an associated recorder 120, which are in turn connected to display systems 130. In another aspect (not shown) the display system 130 may constitute a single display wherein space on the display is allocated for each camera.

FIG. 1B illustrates a next-generation surveillance network system wherein existing analog cameras 110 are connected to a video server 115 which provides the images detected by each camera 110 to an IP network, such as the internet, 160. The video server digitizes the analog signals received from each of the analog cameras 110. Also connected to network 160 are digital cameras, referred to as network cameras, 140. These cameras directly digitize the images detected and provide these digitized images directly to IP network 160. The images from video server 115 or cameras 140 are provided to a server 142 and connected to a gateway 144. Gateway 144 represents a router or server that is connected to at least one router or server contained in the IP network 160. In addition, firewall 146, gateways 148 and router 149 are well-known elements of an IP network and, in this illustrated example, used to connect surveillance server 170 to the IP network 160.

As would be recognized, surveillance networks need not be composed solely of video equipment and information from other sensors may contribute to the overall surveillance network. In the illustrated example, RFID sensors 150 are used to provide additional information associated with RFID tags. For example, when an RFID sensor 150 is located at a door entrance that is also monitored by a video camera, a correlation between the information provided by the RFID sensor, e.g., an identification tag number, and a video image can be made to insure that the party is authorized to use the RFID sensor. Information from the RFID sensors 150 may be transmitted wirelessly to an application 155, and may further transmit the RFID sensor data via IP network 160 or wireless network 165. Not shown are audio data channels or other similar parameters or characteristics that may be monitored. Operation and modeling of RFID networks is more fully disclosed in commonly-owned, co-pending, U.S. patent application Ser. No. 11/325,108, entitled "Method and Apparatus for Representing, Managing and Problem Reporting in RFID Networks," filed Jan. 3, 2006, the contents of which are incorporated by reference herein.

The collected video and RFID data, in this illustrated case, are provided to the surveillance application server 170, which may process, correlate and display (not shown) the received data and may further store the collected information, in raw and processed form on one or more storage devices 185 either attached directly or via a Storage Area Network (SAN). Operation and modeling of SANs is more fully disclosed in commonly-owned, co-pending, U.S. patent application Ser. No. 11/176,982, entitled "Method and Apparatus for Representing, Managing and Problem Reporting in Storage Area Networks," filed Jul. 8, 2005, the contents of which are incorporated by reference herein.

Figure 2A:
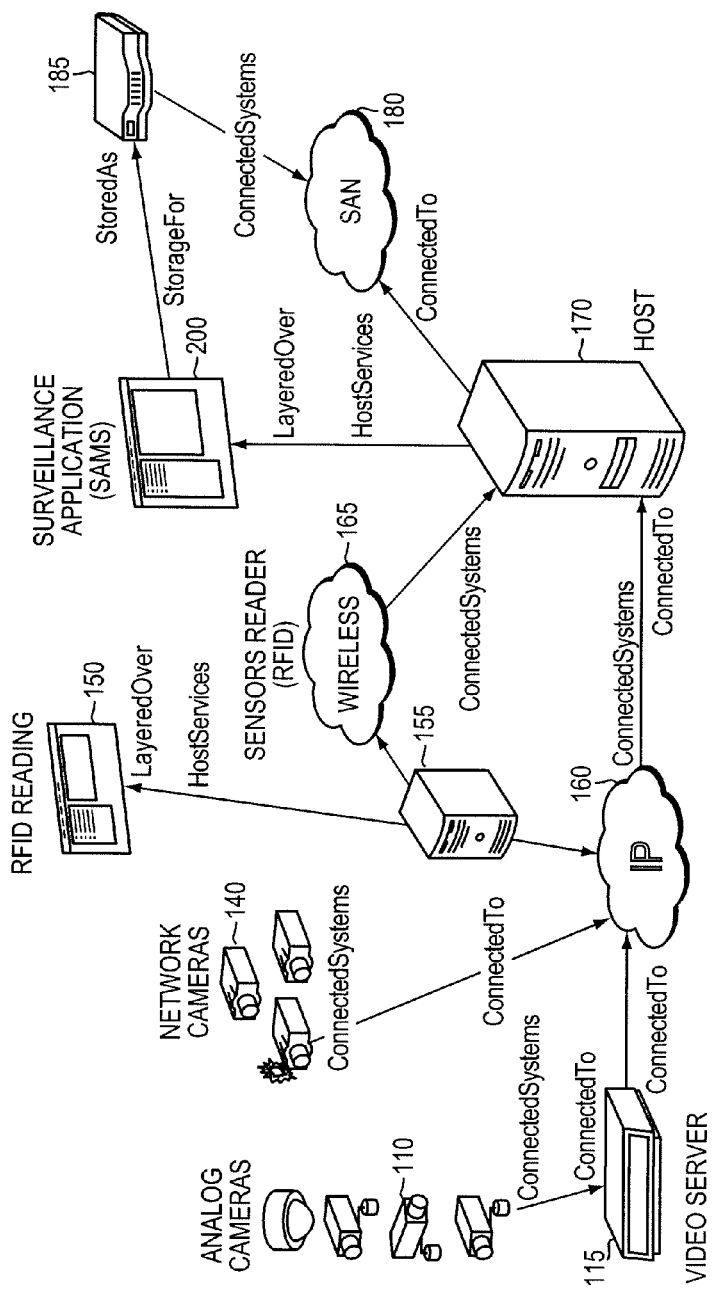
FIGS. 2A and 2B illustrate a surveillance network in accordance with the principles of the invention.

FIG. 2A illustrates the surveillance network shown in FIG. 1B modeled in accordance with the principles of the invention. In this illustrative example, the logical relationships between the network elements are shown for processing the information collected by the surveillance network. In addition a surveillance application 200 is shown, is logically located on host 170 and processes the data provided via the IP network 160 and/or wireless network 165. For example, the sensor elements (i.e., analog camera/video server 110/115, and network camera 140) are represented as a connected systems object possessing a connected-to relationship to IP network 160. The IP network 160 and wireless networks 165 are similarly represented as system objects possessing a connected-to relation to surveillance server or host 170. The host 170 is represented as a host services object and hosts surveillance application 200, while surveillance application 200 possesses a layered-over relationship to host 170. The relationships may be further expressed as: surveillance server host surveillance application 200 or surveillance application 200 is hosted by surveillance server 170.

Figure 2B:
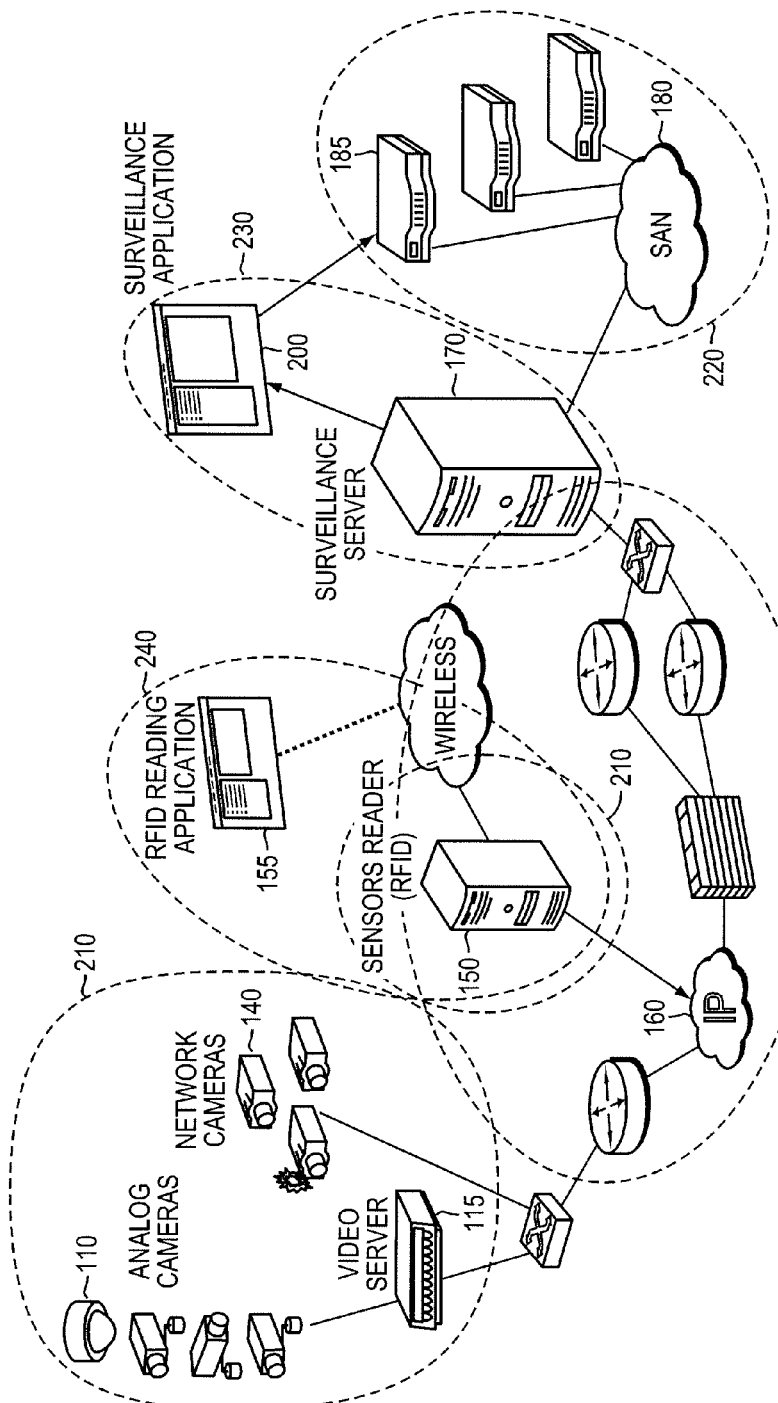

FIG. 2B illustrates a second exemplary representation of the surveillance network shown in FIG. 2A. In this exemplary representation the surveillance network is partitioned into logical domains wherein the components within a domain are associated with a known function or operation. For example, domain 210 represents the infrastructure—i.e., cameras 110, 140, RFID sensors 150, network 160 and host 170, of the illustrated surveillance network. Domain 220 represents the storage area network portion of the illustrated surveillance network including host 170, SAN network 180 and storage device 185. Domain 230 and 240 are associated with the applications or processes that are operating on the underlying infrastructure. For example, sensor application 155' may include processes that format the collected data prior to transmission in a form that is comparable to or with surveillance application 200. Surveillance application 200 may properly interpret and operate on the data received based on the transposition of the raw RFID data to a suitable format. Similarly, the surveillance application 200 may format or process the received data and provide it to storage 185. Storage application (not shown) may operate on the received data to store it in format suitable for storage and subsequent retrieval on one or more selected storage devices 185. In this illustrative multi-domain representation of the surveillance network, host 170 and surveillance application 200 represent intersection points between the respective domains. The intersections points provide a means of communicating information between the respective domains. In the illustrated case, the intersection points are shown with respect to two domains, however, it would be recognized that an intersection point may be a member or included in more than two domains.

Figure 3A:
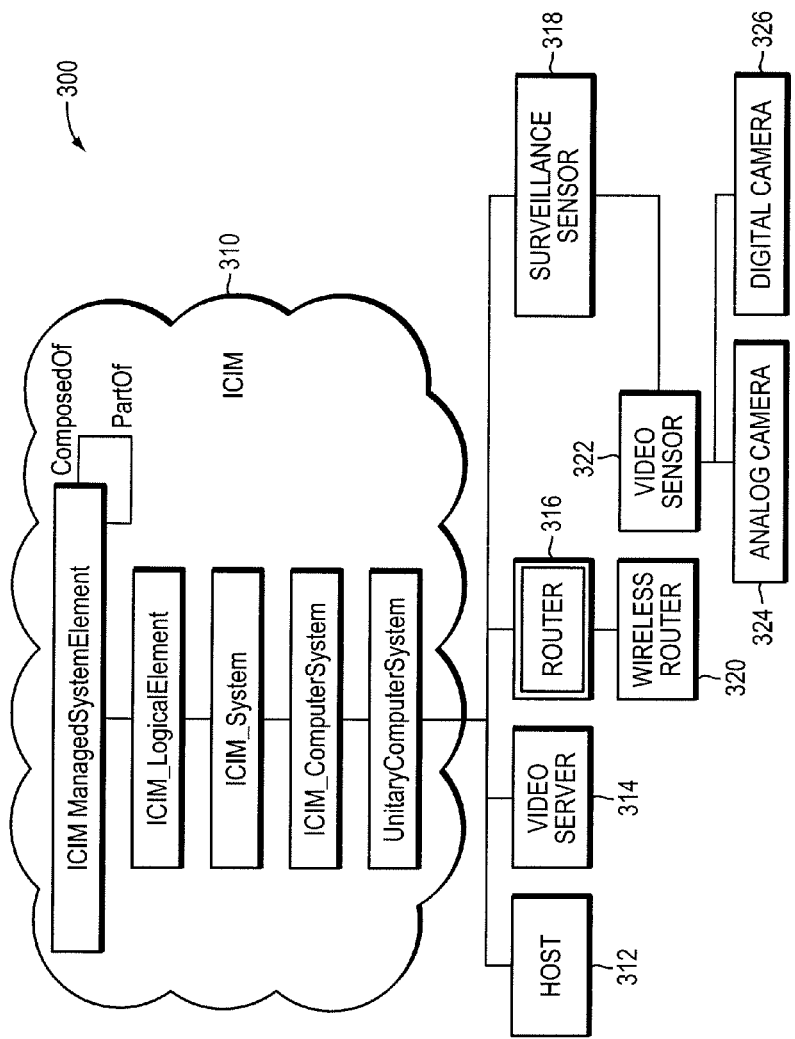
FIGS. 3A-3C illustrate modeling representation of a surveillance network in accordance with the principles of the invention.
Figure 3B:
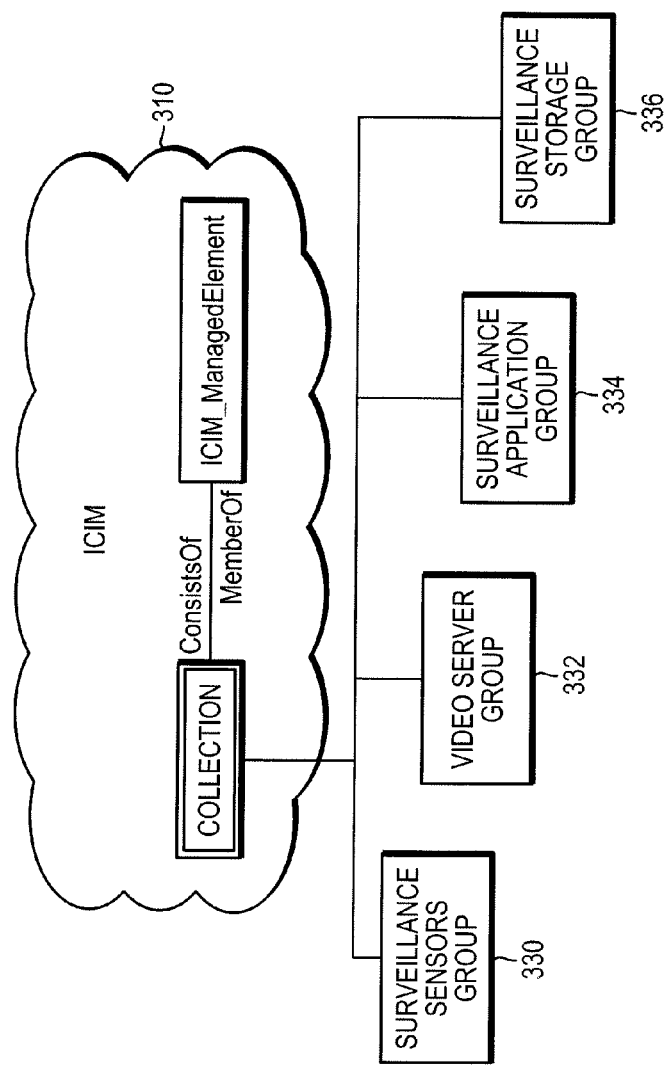
Figure 3C:
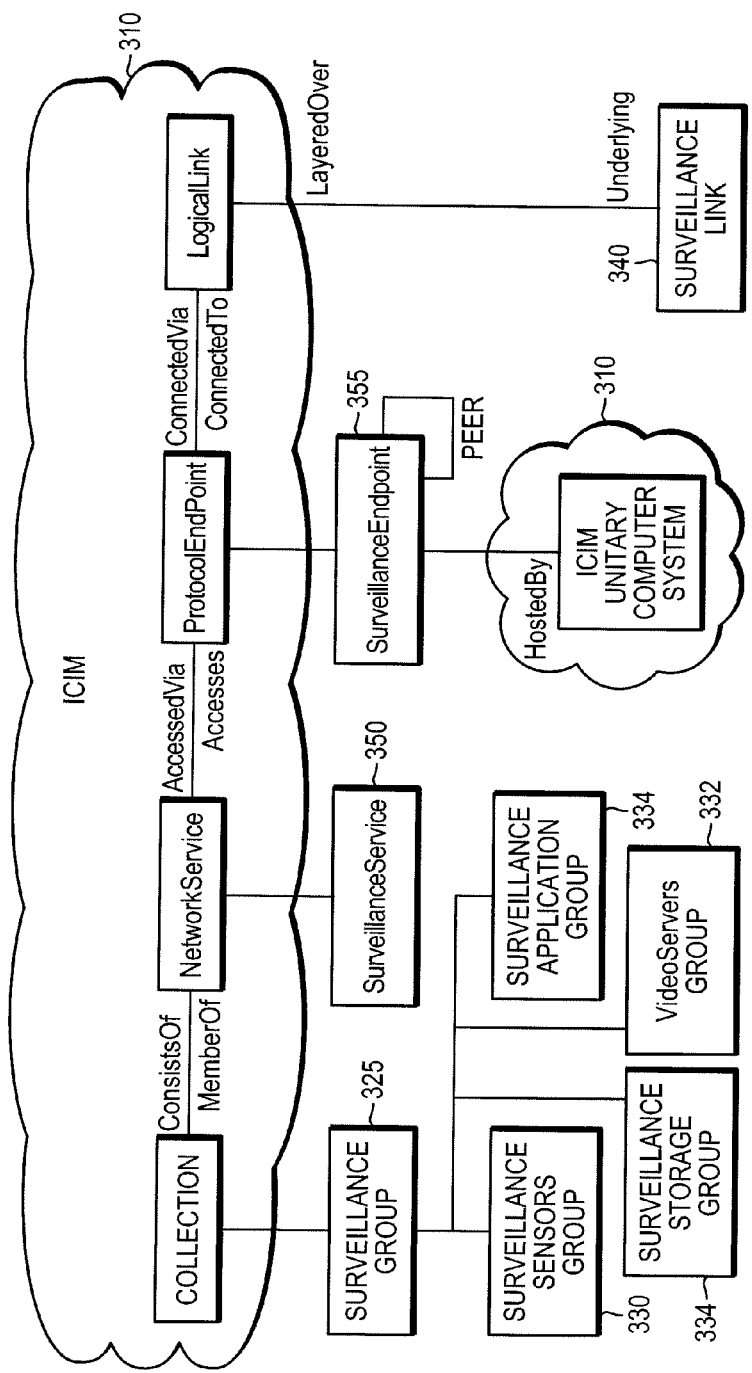

FIGS. 3A-3C, collectively, illustrate an exemplary embodiment of a surveillance system model in accordance with the principles of the present invention. The model shown is an extension of known network models, such as the EMC/Smarts Common Information Model (ICIM), or similarly defined or pre-existing CIM-based model and adapted for the Surveillance network. EMC and SMARTS are trademarks of EMC Corporation, Inc., having a principle place of business in Hopkinton, Mass. USA. The EMC/Smarts model is an extension of the well-known DMTF/SMI model. Model based system representation using the ICIM model is discussed in the commonly-owned referred-to related US Patents and patent applications, the Related Applications, the contents of which are incorporated by reference herein.

FIG. 3A illustrates an object model 300 associated with the surveillance system infrastructure in accordance with the principles of the invention. The existing ICIM model 310 includes the elements entitled Managed System, Logical Element, ICIMSystem, ICIM_ComputerSystem and Unitary Computing System. These objects represent parameters and attributes associated with a network system, generally. In addition to known network objects the surveillance mode includes new objects Surveillance Host 312, Video Server 314, Surveillance Router 316, and Surveillance Sensor 318. Furthermore, Wireless Router 320 depends from and inherits the properties and attributes of object Router 316 and includes more specific parameters associated with a wireless connection. Similarly, the object Video Sensor 322 depends from object Surveillance Sensor 318 and inherits the properties and attributes of the Analog Camera 324 and Digital Camera 326 sensors.

FIG. 3B illustrates a further extension of the existing ICIM model 310 to accommodate a collection of specific objects. For example, Surveillance Sensors Group 330 represents a grouping of the surveillance sensors and inherits the properties and attributes of each of the surveillance sensors. Similarly, Video Server Group 332, Surveillance Application Group 334 and SurveillanceStorageGroup 336 are collections of the corresponding objects at a higher level. These groups represent a collection of entities that serve a specific purpose. For example, the Surveillance Sensor Group 330 collects together common entities of the surveillance sensors, e.g., RFID, analog camera, and/or digital camera. Alternatively, the surveillance sensor group 330 may collect together all sensors that cover a common area.

FIG. 3C illustrates further extension of the existing ICIM Model 310 enabling for cross domain correlation of underlying network and devices failures to the Surveillance Management domain by effecting Surveillance services 350. Network and Devices failures propagate through Surveillance ProtocolEndPoint 355 that are hosted on those devices and through Surveillance links 340 that are layered over the other Domain logical links. Some examples for such relationship can exist between the Surveillance Protocol End Points and a Host or Video Server or Camera and the Surveillance Link that represents logical links between Surveillance Protocol End Points that can be layered over Network Links (for example IP Network Link). Using ICIM inheritance capability, Surveillance Link 340, for example, inherits the properties and attributes from the ICIM LogicalLink and includes additional specific parameters and attributes related to the Surveillance Feed Connection, e.g., video frame for video application. Similarly the Surveillance ProtocolEndPoint inherits attributes and properties from ICIM ProtocolEndPoint and SurveillanceService 350 inherits from the ICIM Network Services.

It would be understood that the objects associated with the IP network domain are known in the art as represented in the existing ICIM model and need not be disclosed in further detail herein.

Figure 4:
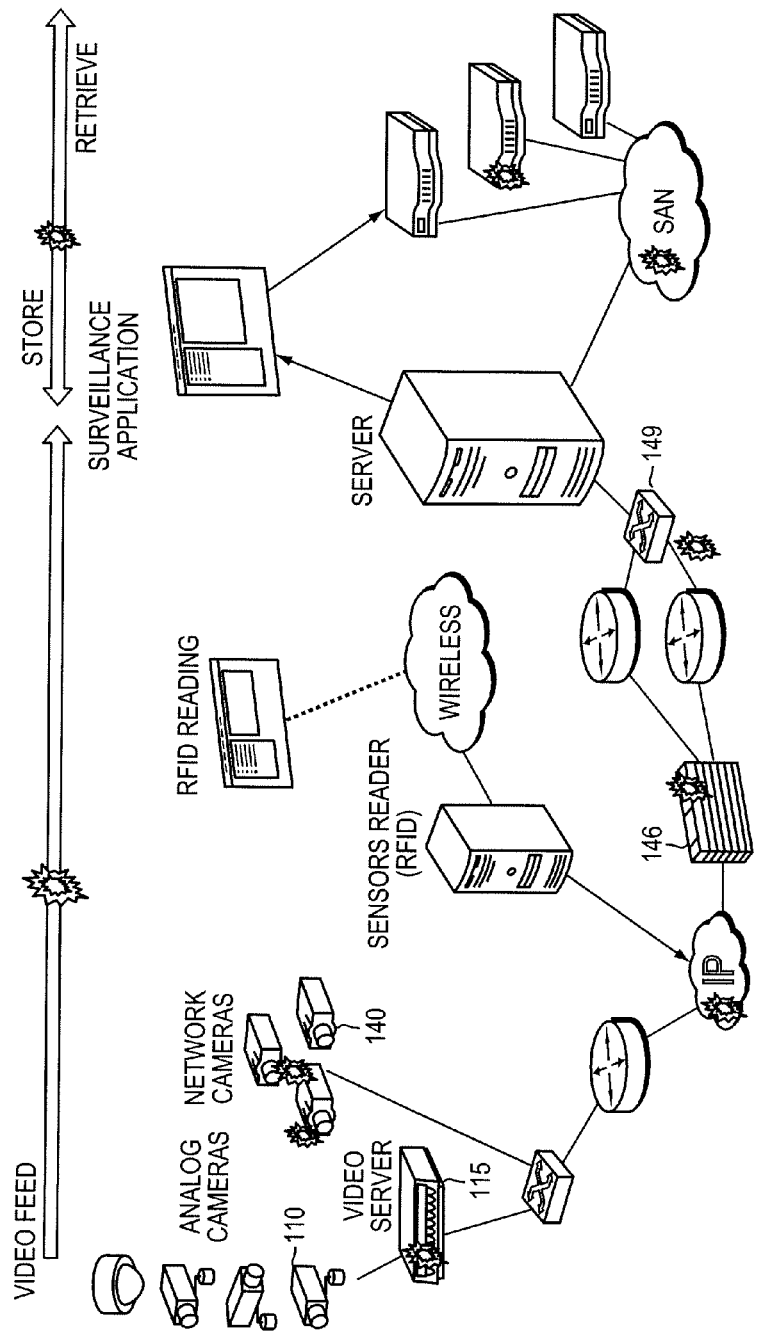
FIG. 4 illustrates an example of the propagation of an error in the surveillance network shown herein.

FIG. 4 illustrates the plurality of potential points that may cause a failure in the end-to-end service and dependent business process of the surveillance network illustrated. For example, a failure in video server 115 may cause information from each of the associated analog cameras 110 to be lost even though the cameras 110 are themselves functioning properly. Similarly, an incorrect setting in firewall 148 or a failure in server 149 may cause a loss of information from the video cameras 110, 140. Similar loses of data or information may occur if the Surveillance Application 200 or one or more elements in the SAN 180 occurs.

Root cause analysis and/or impact analysis, such at that described in common-owned, co-pending U.S. patent application Ser. No. 11/263,689 entitled "Apparatus and Method for Event Correlation and Problem Reporting," and U.S. Pat. Nos. 7,003,433, 6,868,367, 6,249,755 5,661,668, and 5,528,516, issued to Yemini, Y., which are incorporated by reference herein, may be performed to determine the causes of a detected event or project the impact a failure may cause.

In some aspects, although a failure may occur in one or more modeled components, symptom(s) or observable events may, or may not, be generated to indicate that a component is experiencing a failure. A root-cause analysis correlation must be powerful enough to be able to deal with scenarios in which symptoms are generated, and those in which some symptoms are not generated, to indicate the cause of the failure. As described in the aforementioned US Patents and patent application, a determination of a measure of the elements of a causality matrix may be used to determine the most likely cause of the one or more of the symptoms or observed events. Similarly, in the case of multiple domains, the mostly likely event(s) associated with each domain may be correlated to determine a most-likely event(s) of the cause of an observed event or symptom. For example, the symptoms or observable events may be associated with components or elements associated with at least two domains—i.e., an intersection point or an association—and the analysis may be preformed with regard to these intersection points.

FIG. 5 illustrates an exemplary analysis associated with the surveillance network shown in FIG. 2. In this exemplary analysis, the determination of a network camera 140 being classified as being "down" is most likely caused by the camera not working when it hosting computer system is indicated to be running. Similarly, a determination or detection that the surveillance application 200 (FIG. 2A) is down is attributed to the application itself when the hosting computer 170 is indicated to be running. It would be recognized that an indication of the surveillance application 200 being down and an indication that host 170 being down would attribute the cause of the observed events to host 170 being down. FIGS. 6A and 6B illustrate the impact on a business operation caused by a failure or detected error in the Surveillance, Network infrastructure, application domains, storage domain, etc., as shown in FIG. 2. From the teachings to the referred-to US Patents and patent applications, impact and/or behavior models similar to that shown in FIG. 4E may be developed from the information shown in FIGS. 5, 6A and 6B and need not be discussed in detail herein. However, for example, using FIGS. 5, 6A and 6B, a user can relate the indication of a failure in a Surveillance Sensor (e.g,Video Camera or an RFID Reader device) to a further impact analysis to determine a specific Surveillance Business Target that is not being met due to this failure. A similar analysis can be done by recognizing the impact of network connection degradation on a Surveillance Link and ultimately it's impact on the business Surveillance Services. While the above focused on the front end of the Surveillance Service, failures at the backend storage systems or storage area network will impact the surveillance service when the sensor feed can not be stored properly or retrieved at the time needed.

Figure 7:
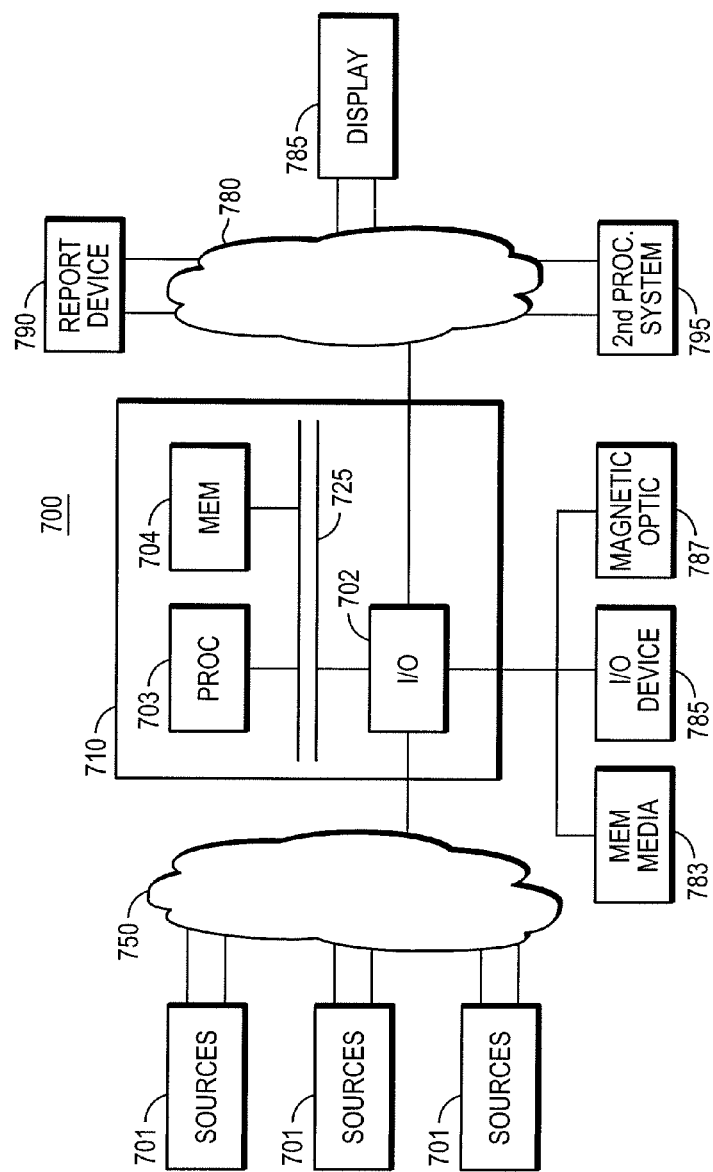
FIG. 7 illustrates a system implementing the process shown herein.

FIG. 7 illustrates an exemplary embodiment of a system 700 that may be used for implementing the principles of the present invention. System 700 may contain one or more input/output devices 702, processors 703 and memories 704. I/O devices 702 may access or receive information from one or more sources or devices 701. Sources or devices 701 may be devices such as routers, servers, computers, notebook computer, PDAs, cells phones or other devices suitable for transmitting and receiving information responsive to the processes shown herein. Devices 701 may have access over one or more network connections 750 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 702, processors 703 and memories 704 may communicate over a communication medium 725. Communication medium 725 may represent, for example, a bus, a communication network, one or more internal connections of a circuit, circuit card or other apparatus, as well as portions and combinations of these and other communication media. Input data from the client devices 701 is processed in accordance with one or more programs that may be stored in memories 704 and executed by processors 703. Memories 704 may be any magnetic, optical or semiconductor medium that is loadable and retains information either permanently, e.g. PROM, or non-permanently, e.g., RAM. Processors 703 may be any means, such as general purpose or special purpose computing system, such as a laptop computer, desktop computer, a server, handheld computer, or may be a hardware configuration, such as dedicated logic circuit, or integrated circuit. Processors 703 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 704. The code may be read or downloaded from a memory medium 783, an I/O device 785 or magnetic or optical media, such as a floppy disk, a CD-ROM or a DVD, 787 and then stored in memory 704. Or may be downloaded over one or more of the illustrated networks. As would be appreciated, the code may be processor-dependent or processor-independent. JAVA is an example of processor-independent code. JAVA is a trademark of the Sun Microsystems, Inc., Santa Clara, Calif. USA.

Information from device 701 received by I/O device 702, after processing in accordance with one or more software programs operable to perform the functions illustrated herein, may also be transmitted over network 780 to one or more output devices represented as display 785, reporting device 790 or second processing system 795.

Figure 8:
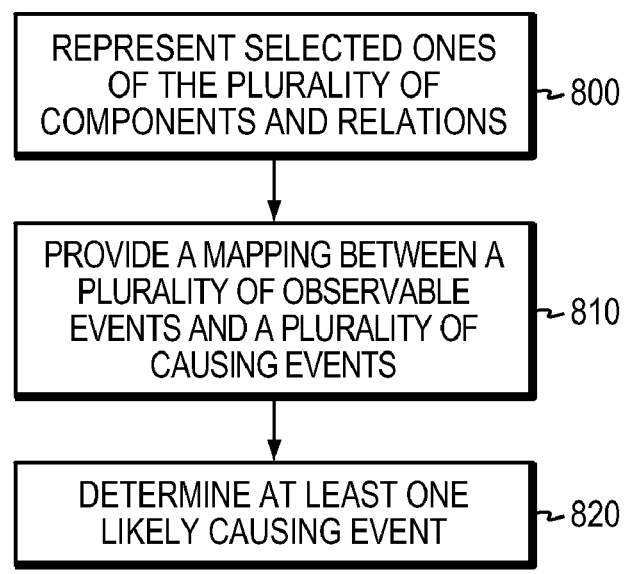
FIG. 8 illustrates an example of the method for performing a system analysis of a surveillance system.

FIG. 8 illustrates an example of the method for performing a system analysis of a surveillance system. Method 800 represents selected ones of the plurality of components and relations. Method 810 provides a mapping between a plurality of observable events and a plurality of causing events. Method 820 determines at least one likely causing event.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It would be recognized that the invention is not limited by the model discussed, and used as an example, or the specific proposed modeling approach described herein. For example, it would be recognized that the method described herein may be used to perform a system analysis that includes: fault detection, fault monitoring, performance, congestion, connectivity, interface failure, node failure, link failure, routing protocol error, routing control errors, and root-cause analysis.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for performing a system analysis of a surveillance system including a plurality of components, said method comprising the steps of:

representing selected ones of the plurality of components and associated relations among the representations of the selected components wherein the plurality of components comprises a plurality of audio and/or video components, with each of a plurality of domains, wherein at least one of the plurality of components is associated with at least two of the domains;

providing a mapping between a plurality of observable events and a plurality of causing events occurring in the selected components in each of the domains, wherein selected ones of the observable events and causing events are associated with each of the at least one component associated with at least two of the domains;

determining at least one likely causing event based on at least one of the plurality of observable events by determining a relationship between each of a plurality of first values and a plurality of second values; wherein the first plurality of values are associated with the plurality of observable events; and wherein the second plurality of values are the plurality of causing events; and determining a likely causing event by correlating the causing events associated with each of the domains.

2. The method as recited in claim 1, wherein the components associated with the at least two domains are selected from the group consisting of: Surveillance Application and Surveillance Sensors.

3. A computer readable storage medium encoded with code thereon for performing a system analysis of a surveillance system including a plurality of components by providing instructions to a processor enabling the processor to execute the steps of:

representing selected ones of the plurality of components wherein the plurality of components comprises a plurality of audio and/or video components and relations among the representations of the selected components, and associated relations, with each of a plurality of domains, wherein at least one of the plurality of components is associated with at least two of the domains;

providing a mapping between a plurality of observable events and a plurality of causing events occurring in the selected components in each of the domains, wherein selected ones of the observable events and causing events are associated with each of the at least one component associated with at least two of the domains;

determining at least one likely causing event based on at least one of the plurality of observable events by determining a correlation between each of a plurality of first values and a plurality of second values; wherein the first plurality of values are associated with the plurality of observable events; and wherein the second plurality of values are the plurality of causing events;

determining at least one likely causing event based on at least one of the plurality of observable events by determining a measure between each of a plurality of values associated with the plurality of observable events and the plurality of causing events in each domain; and determining a likely causing event by correlating the causing events associated with each of the domains.

4. The computer readable storage medium as recited in claim 3, wherein the components associated with the at least two domains are selected from the group consisting of: Surveillance Application and Surveillance Sensors.

* * * * *